United States Patent [19]
Jeavons

[11] Patent Number: 5,829,763
[45] Date of Patent: Nov. 3, 1998

[54] POWER ASSISTED LIFTING DEVICE

[76] Inventor: Peter K. Jeavons, 56 St. Andrews Street, Brantford, Ontario, Canada, N3T 6H3

[21] Appl. No.: 880,165

[22] Filed: Jun. 20, 1997

Related U.S. Application Data

[63] Continuation of Ser. No. 539,603, Oct. 5, 1995, abandoned.
[51] Int. Cl.[6] .................................................... B62B 5/02
[52] U.S. Cl. .............................................. 280/5.3; 280/5.2
[58] Field of Search .................................. 280/5.3, 47.29, 280/5.2, 5.22, 5.24, 5.26, 5.28, 5.32; 414/490; 254/7 R, 7 B, 7 C

[56] References Cited

U.S. PATENT DOCUMENTS

| 2,708,473 | 5/1955 | Gable et al. | 280/5.32 |
|---|---|---|---|
| 3,052,323 | 9/1962 | Hopfeld | 280/47.29 |
| 3,215,402 | 11/1965 | Holt et al. | 254/7 B |
| 3,905,437 | 9/1975 | Kaiho et al. | 280/5.3 |
| 4,057,119 | 11/1977 | Melson | 280/5.3 |
| 4,109,740 | 8/1978 | Andruchiw | 280/5.22 |
| 4,570,953 | 2/1986 | McPeak et al. | 280/5.3 |
| 4,741,659 | 5/1988 | Berg | 414/490 |
| 5,195,762 | 3/1993 | Pressly | 414/490 |

FOREIGN PATENT DOCUMENTS

| 978222 | 11/1975 | Canada | 280/5.22 |
|---|---|---|---|
| 731553 | 9/1932 | France | 280/5.24 |
| 1151220 | 1/1958 | France | 280/5.32 |
| 651213 | 4/1935 | Germany | 280/5.24 |
| 95267 | 6/1982 | Japan | 280/5.22 |
| 1098777 | 1/1968 | United Kingdom | 280/5.32 |
| 17901 | 9/1993 | WIPO | 280/5.3 |

*Primary Examiner*—Thomas J. Brahan
*Attorney, Agent, or Firm*—Patrick J. Hofbauer

[57] ABSTRACT

In combination an elevating unit for readily releasable attachment to a hand truck is disclosed. The elevating unit comprises, when in place on the hand truck, a main body portion having a front side and a back side. An extension leg has a foot portion and is disposed in sliding relation within the main body portion for selectively controlled movement between a first extended position whereat the foot portion is disposed below the lower end of the frame and a second retracted position whereat the foot portion is raised from being disposed below the lower end of the frame. An elongate threaded rod is operatively mounted on the main body portion for rotation in opposed first and second rotational directions by an electrically energizable reversible motor. A recirculating ball nut threadibly engages the elongate threaded rod for movement along the length thereof as the elongate threaded rod rotates. The extension leg is secured to the recirculating ball nut for movement therewith. A three position electrical switch is electrically coupled to the electrically energizable reversible motor to permit selective actuation of the drive means in the first and second directions. A first bracket is mounted on the main body portion for removable secured engagement of the main body portion to the upper cross-member. A second bracket is mounted to the main body portion for removable secured engagement of the main body portion to the lower cross-member.

16 Claims, 9 Drawing Sheets

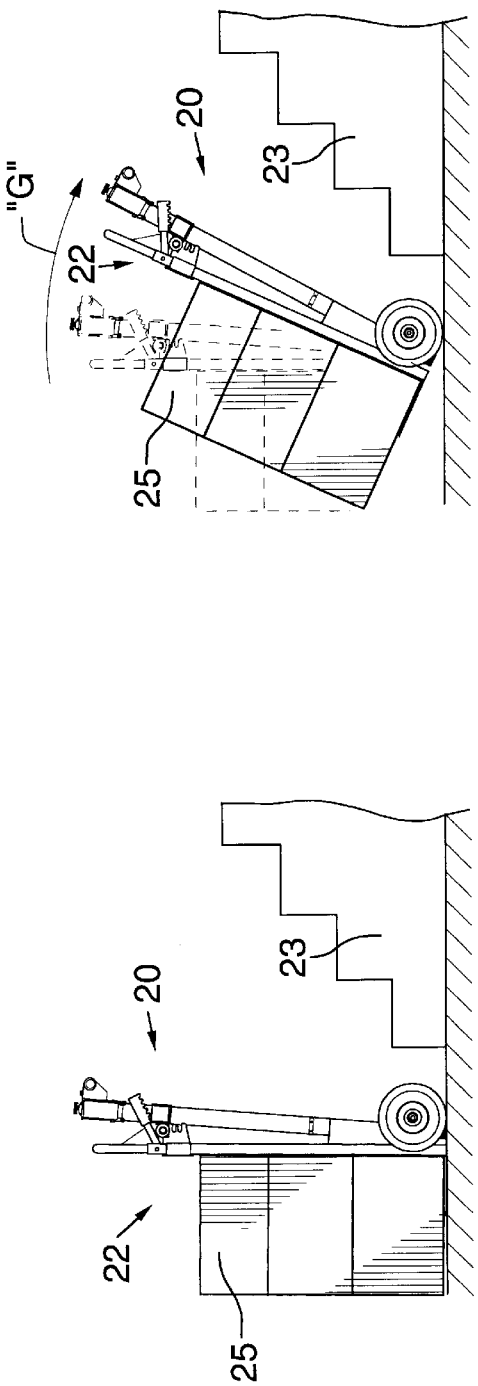
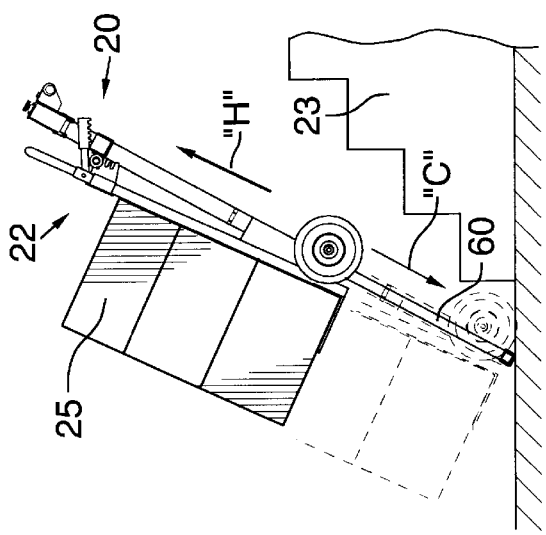

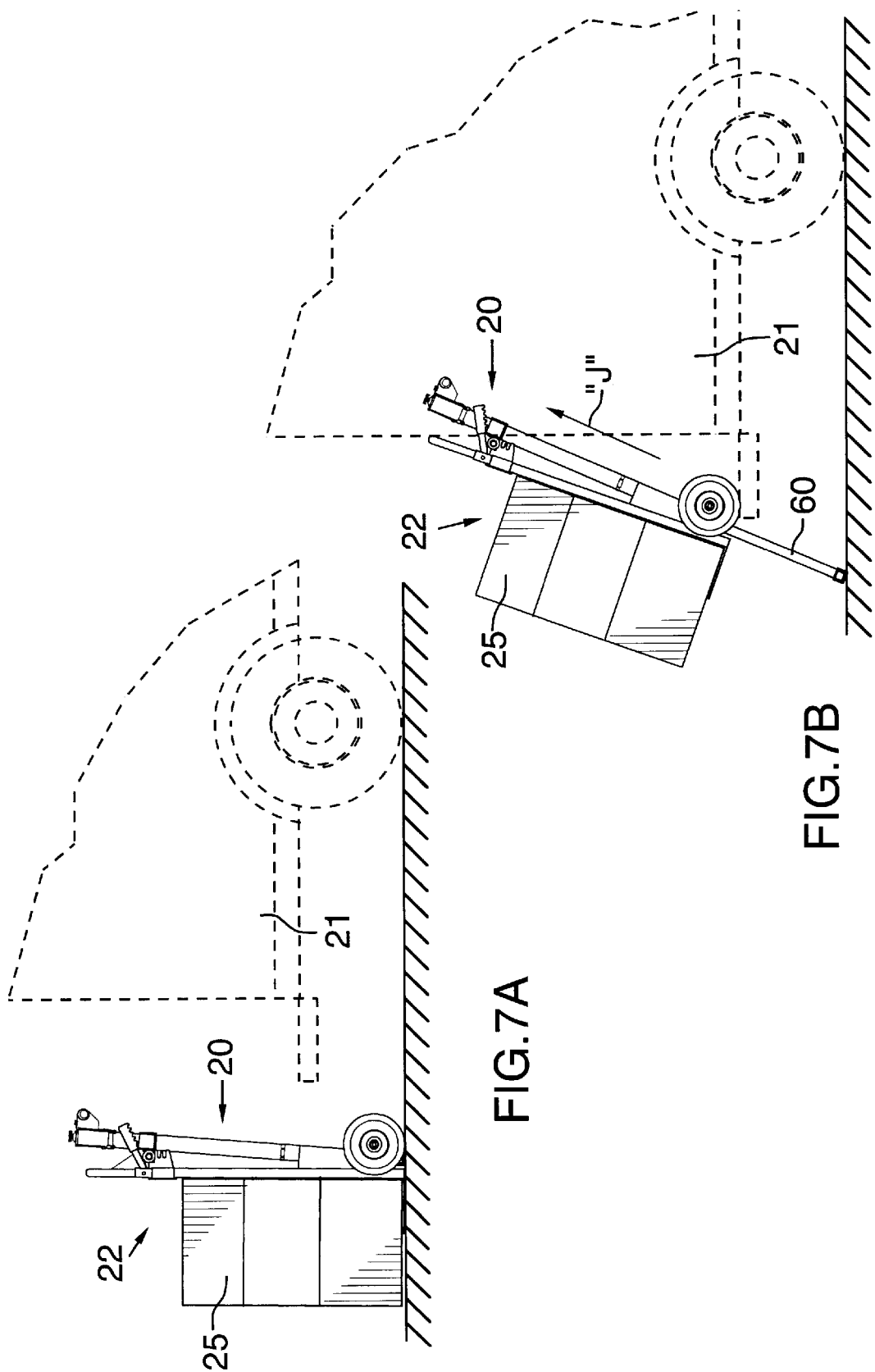

POWER ASSISTED LIFTING DEVICE

The application is a continuation, of application Ser. No. 08/539,603, filed Oct. 5, 1995, now abandoned.

FIELD OF THE INVENTION

This invention relates to elevating units for attachment to manual hand trucks, and more particularly, to such elevating units that are readily mountable on and removable from existing manual hand trucks with minimal modification to such hand trucks.

BACKGROUND OF THE INVENTION

Various types of conventional hand trucks for manual hauling of payloads, such as boxes, appliances, packages, sacks, and so on, onto and off of delivery trucks, are well known. Manual manipulation of hand trucks onto or off of a delivery truck is often hazardous and may require two or more people to physically perform the lowering, or lifting of the hand truck and supported payload, especially when moving large, heavy payloads such as appliances. Further, during use of such hand trucks, it is quite common to encounter stairs, which, by their very nature, cannot be readily traversed by a conventional hand truck carrying a significant payload.

Some assistance to the problems outlined above with respect to the use of manual hand trucks has been supplied by powered hand trucks that have an integral selectively controllable extension leg that is extendable a significant distance below the level of the hand tuck, and is subsequently retractable. These hand trucks are typically electrically powered as supplied by a rechargeable battery. See, for example, U.S. Pat. No. 2,608,258, (Jenkins) to a power hand truck, and Canadian Patent No. 1,071,148 (Jeavons). In this manner, the extension leg can be used to manoeuvre the hand truck onto or off a delivery truck, or up or down stairs. Such extension leg type hand trucks are complicated, expensive, and none are known to be entirely satisfactory. The extension legs and associated drive mechanism, including a power source, that form an integral part of such prior art powered hand trucks tend to make them heavy, which is undesirable for the easy and safe manoeuvring of the hand truck and payload. Further, acceptance of such powered hand trucks has met with resistance, particularly with regard to those operators who would be required to replace a large inventory of existing manual hand trucks with new, expensive power models, thus rendering their investment in the manual hand trucks of little residual value. An example of such an operator would be a large courier or cartage company who might own, in some instances, thousands of manual hand carts. Accordingly, a need exists in the art for an elevating unit which is readily mountable onto and removable from an existing manual hand truck, which elevating unit provides for easy manoeuvring, with power assist, of the hand truck together with a payload thereon, onto and off of delivery trucks and up and down stairs, and the like.

SUMMARY OF THE INVENTION

In accordance with one aspect of the present invention, there is provided in combination an elevating unit for readily removable attachment to a hand truck having a frame extending in a substantially vertical direction from a lower end to an upper end and extending laterally from a left side to a right side, upper and lower cross-members extending substantially between the left and right sides of the frame, a handle means disposed adjacent the upper end, a front side and a back side, with a payload supporting surface extending forwardly from the front side, and a pair of wheels operatively mounted on the frame adjacent the lower end thereof for rotation about a common lateral axis. The elevating unit comprises, when in place on the hand truck, a main body portion having a front side and a back side, and an extension leg having a foot portion and being operatively mounted on the main body portion for selectively controlled movement between a first extended position whereat the foot portion is disposed below the lower end of the frame and a second retracted position whereat the foot portion is raised from being disposed below the lower end of the frame. A drive means is operatively coupled to the extension leg to selectively move the extension leg in a first direction from the first extended position to the second retracted position, and in a second direction from the second retracted position to the first extended position. A control means is operatively coupled to the drive means to permit selective actuation of the drive means in the first and second directions. A first bracket means is mounted on the main body portion in disposed relation to the front side of the main body portion for readily removable secured engagement of the main body portion to the upper cross-member of the hand truck. The first bracket means is substantially C-shaped in cross section, defining a forwardly facing opening, with a lower arm of the C-shape forming a load bearing portion and with an upper arm of the C-shape forming a weight transmitting portion. The upper and lower arm portions are spaced apart sufficiently to receive the upper cross-member therebetween. A channel blocking means is readily movable between a first blocking position whereat the channel blocking means occludes the opening to thereby hold the upper cross-member in operative, secured relation, and a second open position whereat the channel blocking means is removed from occluding the opening to thereby provide for ingress and egress of the upper cross-member. A second bracket means is mounted to the main body portion in disposed relation to the back side of the main body portion for readily removable secured engagement of the main body portion to the lower cross-member. The second bracket means comprises a weight transmitting portion shaped and dimensioned to rest on the lower cross-member in weight transmitting relation.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

BRIEF DESCRIPTION OF THE DRAWINGS

A preferred embodiment of this invention will now be described by way of example in association with the accompanying drawings in which:

FIGS. 6A through 6E show the elevating unit of Figures 1A and 1B being used to manipulate a manual hand truck and a payload thereon up a flight of stairs; and, FIGS. 7A and 7B show the elevating unit of FIGS. 1A and 1B being used to assist a manual hand truck and payload thereon up onto a delivery truck.

DETAILED DESCRIPTION OF A PREFERRED EMBODIMENT

Figure 1A:
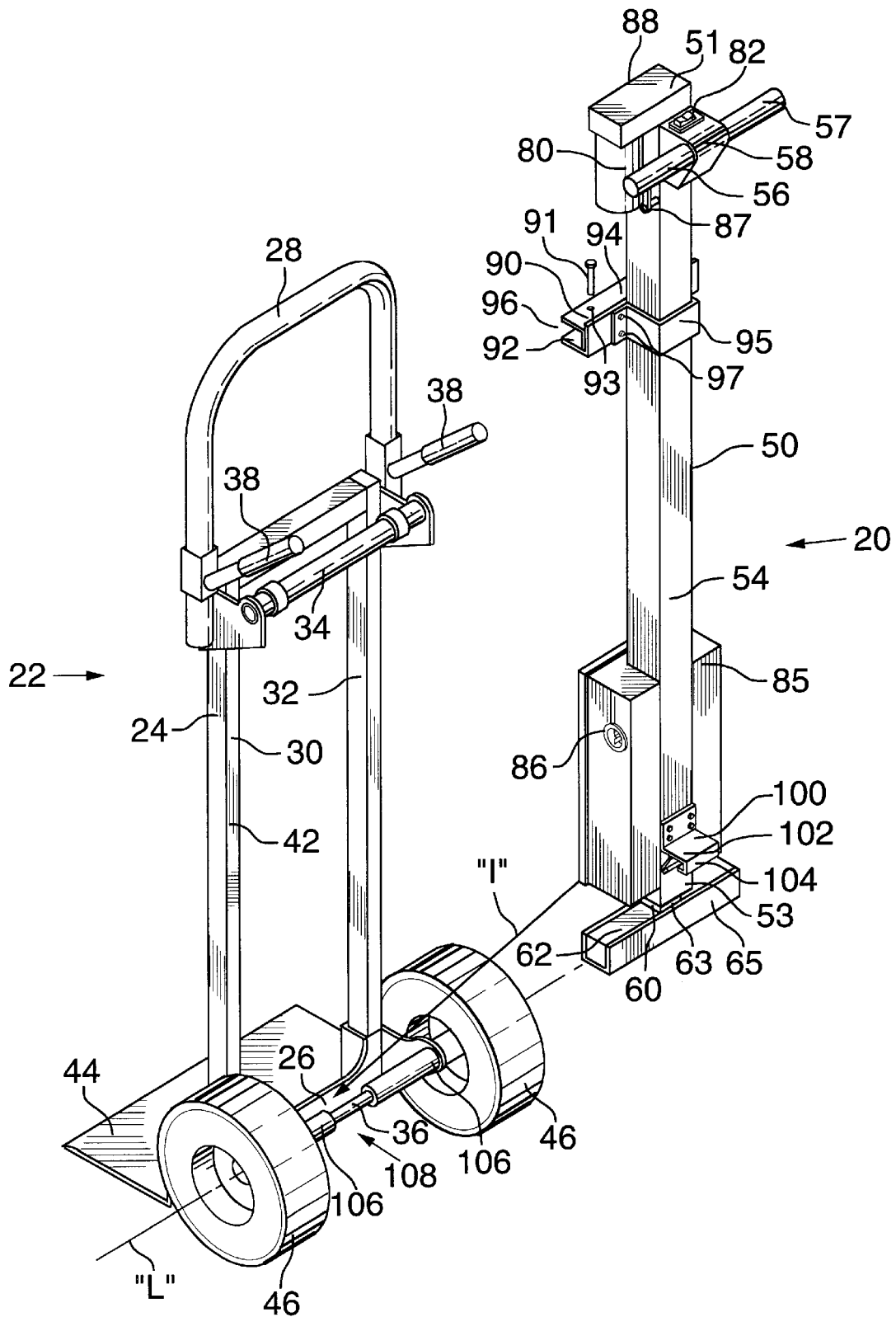
FIG 1A is a perspective view of a preferred embodiment of elevating unit about to be attached to a manual hand truck to form the inventive combination of the present invention.
Figure 1B:
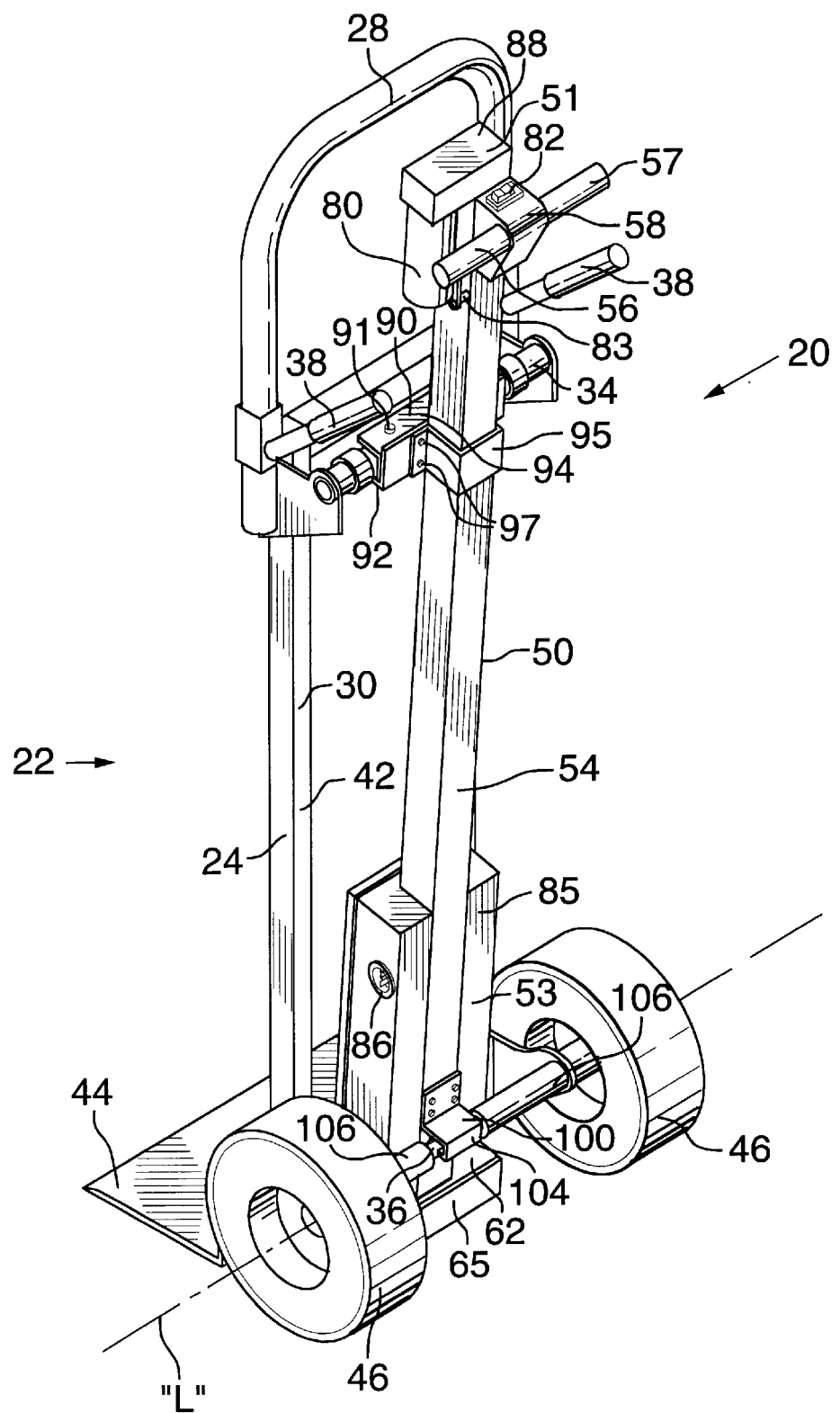
FIG. 1B is a perspective view of the elevating unit and manual hand truck of FIG. 1A, with the elevating unit operatively attached to the manual hand truck.

Reference will now be made to FIGS. 1 through 7A, which Figures show the elevating unit of the present invention, as indicated by general reference numeral 20, for attachment to a manual hand truck, as indicated by the general reference numeral 22. One example of a conventional manual hand truck that may be modified for use in combination as part of the present invention is that available under the trademark MAGLINER from MAGLINE INC. of Pinconning, Mich., 48680 U.S.A. Such a hand truck 22 has a frame 24 extending in a substantially vertical direction from a lower end 26 to an upper end 28, and extending laterally from a left side 30 to a right side 32. An upper cross-member 34 and a lower cross-member 36 extend substantially between the left-30 and right 32 sides of the frame 24. A handle means in the form of two grip handle members 38, is disposed adjacent the upper end 28. The hand truck 22 has a front side 40 and a back side 42. A payload supporting surface 44 extends forwardly from the front side 40, and a pair of wheels 46 are operatively mounted on the crane 24 adjacently lower end 26 thereof, for rotation about a common lateral axis "L".

The elevating unit 20 comprises, when in place on the hand truck 22, a main body portion 50 having a front side 52 and a back side 54. The main body portion 50 essentially houses most of the moving components of the elevating unit 20, and is made of a strong yet light material, such as aluminum, or an aluminum-magnesium alloy. A pair of oppositely directed rubber covered grip handle members 56, 57 each extend outwardly from a base portion 58.

An extension leg 60, having a foot portion 62 disposed at the bottom end 63 thereof, is operatively mounted within the main body portion 50 for selectively controlled movement between a first extended position and a second retracted position. The extension leg 60 comprises a hollow tube 64 having a substantially square cross-section and is elongate along a first longitudinal axis "A", as can be best seen in FIGS. 3 and 4. The extension leg 60 is disposed in sliding relation within the main body portion 50. A slide bearing means in the form of a first slide bearing assembly 76 and a second slide bearing assembly 78, is disposed in operative relation between the extension leg 60 and the main body portion 50. The first slide bearing assembly 76 is mounted on the extension leg 60 adjacent the top end 61 thereof for sliding engagement with the main body portion 50. The second slide bearing assembly 78 is mounted on the main body portion 50 adjacent the bottom end 53 thereof. The extension leg 60 is substantially vertically disposed when in its first extended position and in its second retracted position, and moves linearly along its first longitudinal axis "A" when moving between its first extended position and its second retracted position.

Preferably, the foot portion 62 has a rubber pad 65 on the bottom thereof for the purpose of augmenting traction of the foot portion 62. In the first extended position, the foot portion 62 is disposed below the lower end 26 of the frame 24. In the second retracted position, the foot portion 62 is raised from being disposed below the lower end 26 of the frame 24.

Figure 4:
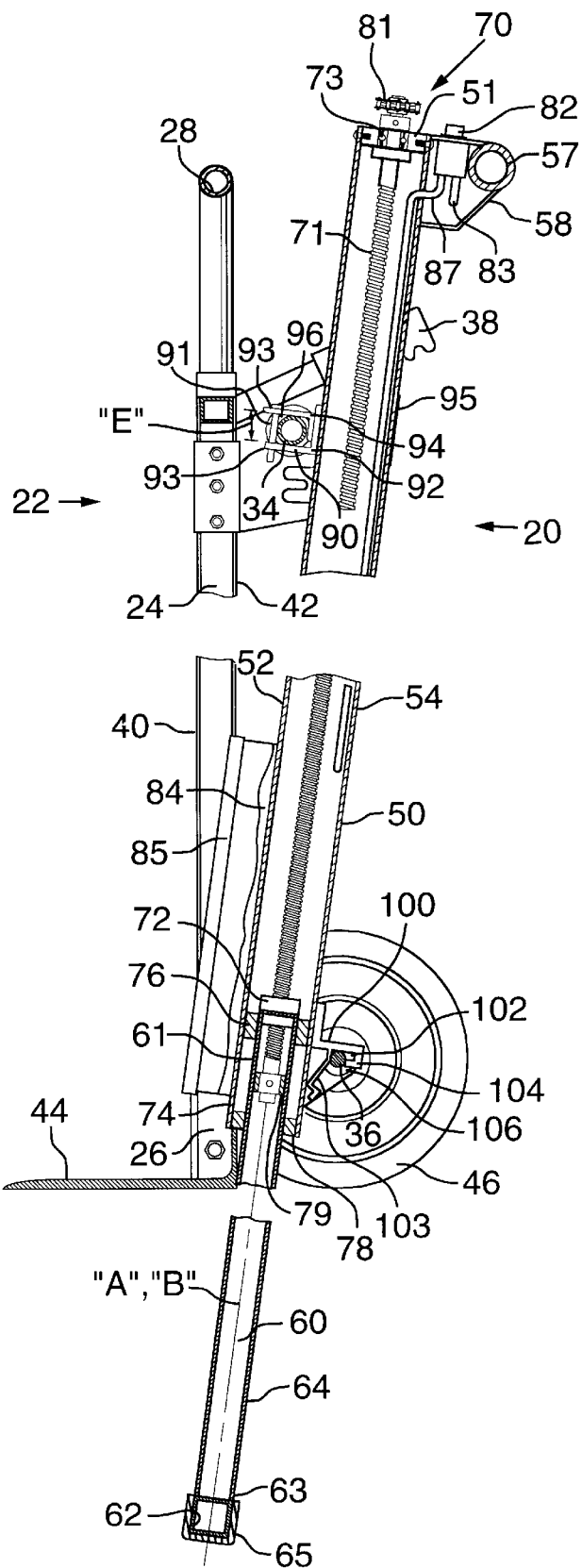
FIG. 4 is an interrupted side sectional view of the elevating. unit attached to the manual hand truck, similar to FIG. 3, but with the extension leg shown in its extended position.
Figure 5:
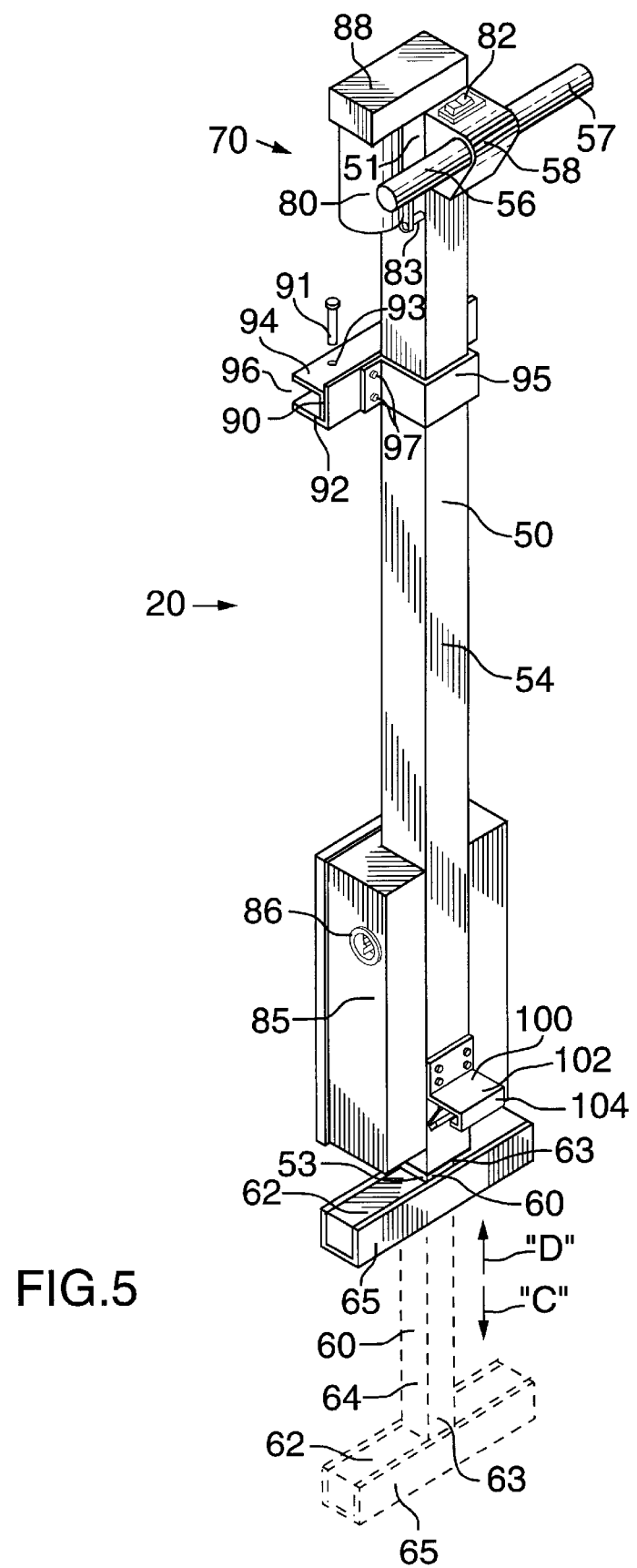
FIG. 5 is an enlarged perspective view of the elevating unit of FIG. 1A.

A drive means, as indicated by the general reference numeral 70, is operatively coupled to the extension leg 60 to selectively move the extension leg 60 in a first direction, as indicated by arrow "C" of FIG. 5, to the first extended position, and in a second direction, as indicated by arrow "D" of FIG. 5, from the first extended position to the second retracted position. The drive means 70 preferably comprises a substantially vertically disposed elongate threaded rod 71 having a second longitudinal axis "B" substantially aligned with the first longitudinal axis "A" (see FIGS. 3 and 4). The elongate threaded rod 71 is operatively mounted within the main body portion 50 by means of a first rotational bearing 73 disposed at the top of the main body portion 50 and a second rotational bearing 74 disposed at the bottom of the threaded rod 71, for rotation in opposed first and second rotational directions, as indicated by arrows "F" and "S" in FIG. 3, respectively, about the second longitudinal axis "B". The second rotational bearing 74 is disposed within a third slide bearing 79 so as to retain the threaded rod 71 in sliding relation with respect to the extension leg 60, and also to preclude lateral movement of the threaded rod 71 within the extension leg 60. A recirculating ball nut 72 is threadibly engaged on the elongate threaded rod 71 for movement along the length thereof as the threaded rod 71 rotates. The extension leg 60 is secured to the recirculating ball nut 72 for movement therewith as aforesaid, in surrounding relation to the threaded rod 71. Rotation of the threaded rod 71 in its first rotational direction "F" causes corresponding linear movement of the extension leg 60 in its first direction "C" towards its first extended position. Rotation of the threaded rod 71 in its second rotational direction "S" causes corresponding linear movement of the extension leg 60 in its second direction "D", toward its second retracted position.

Figure 2:
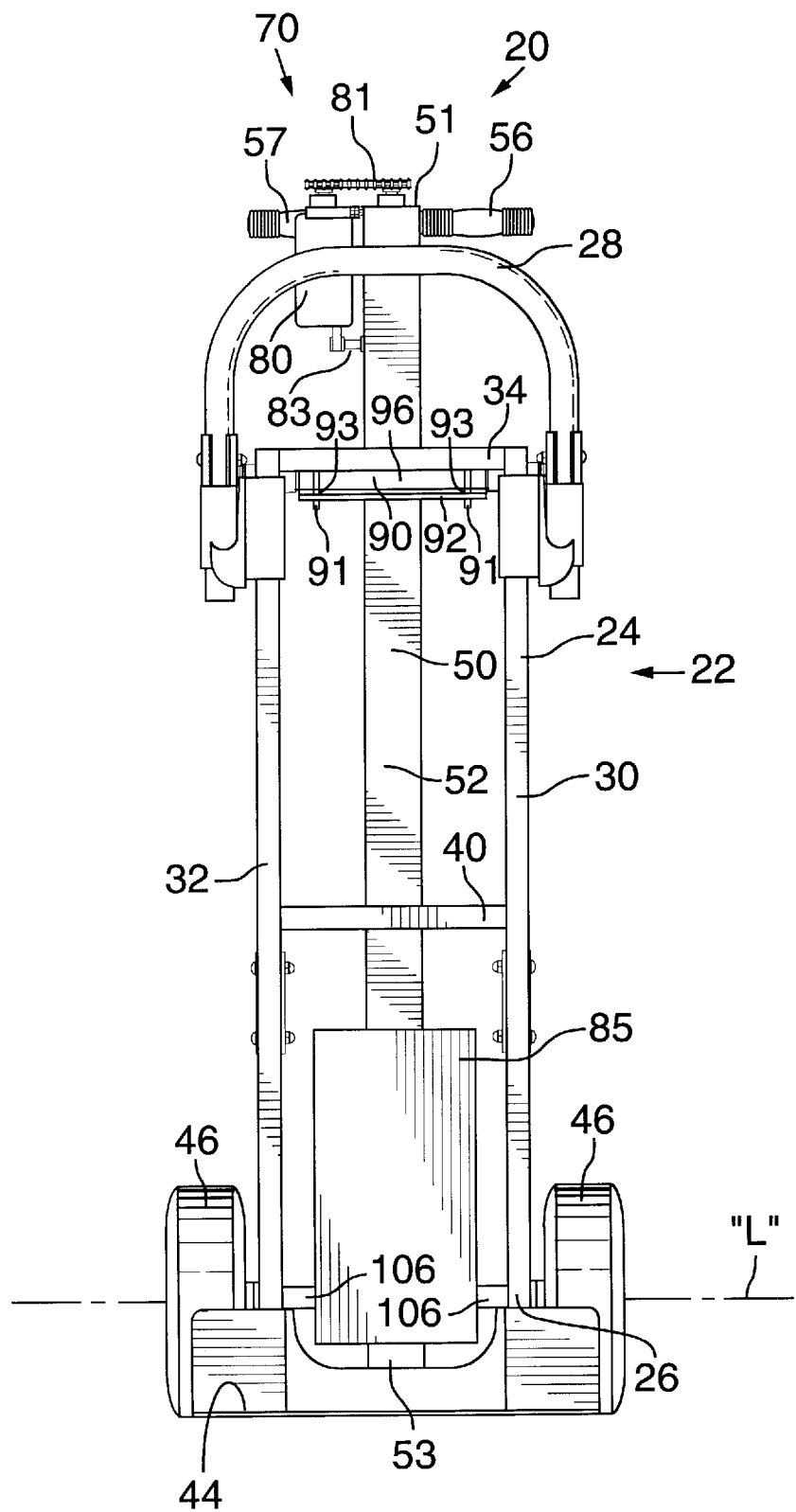
FIG. 2 is a front elevational view of the elevating unit attached to the manual hand truck, as in FIG. 1B.
Figure 3:
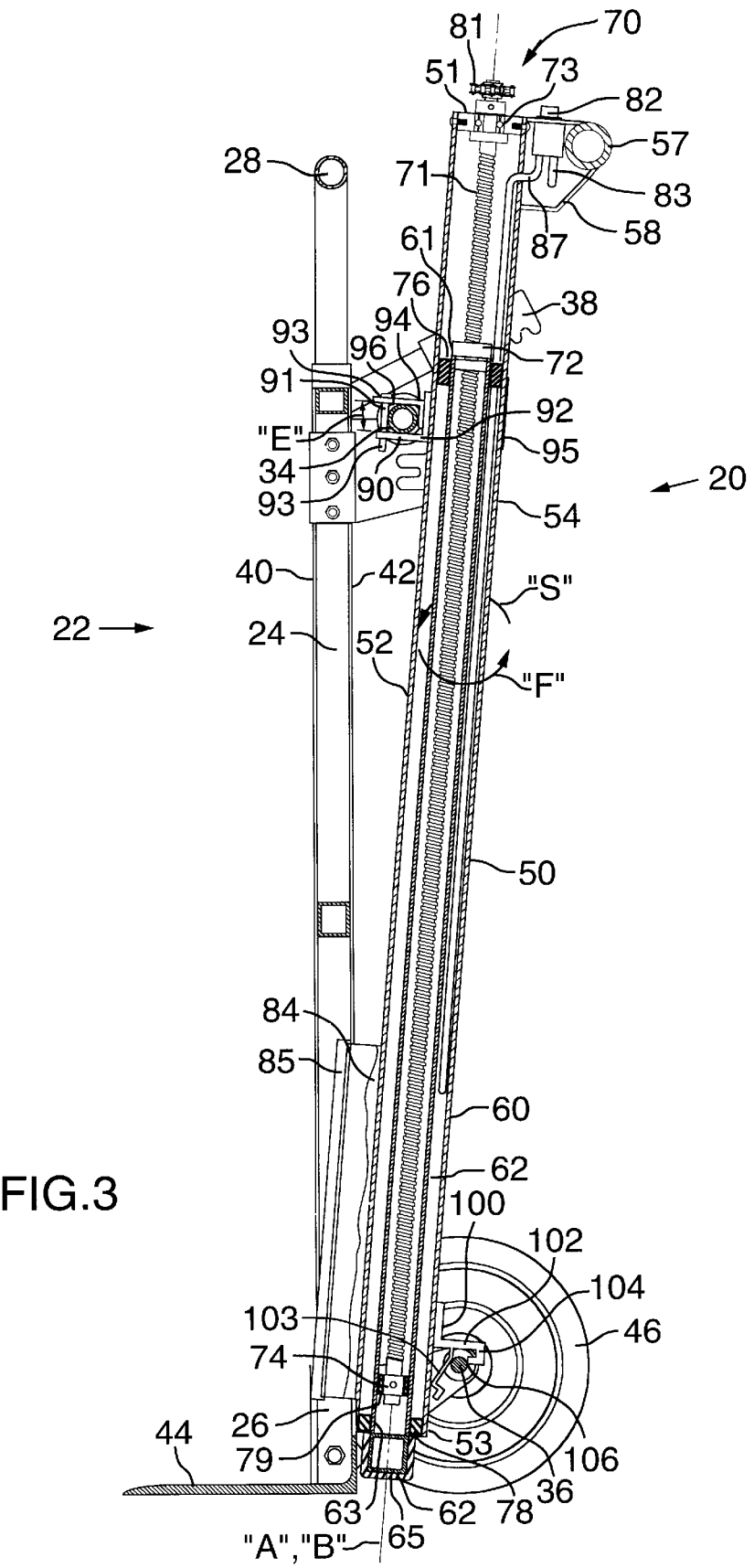
FIG. 3 is a side sectional view of the elevating unit attached to the manual hand truck, taken along section line 3—3 of FIG. 2, with the extension leg shown in its retracted position.

In the preferred embodiment shown, the drive means 70 further comprises a motor means in the form of an electrically energizable reversible motor 80 operatively connected in driving relation to the elongate threaded rod 71 by means of a drive chain 81, as can be best seen in FIGS. 2, 3, and 4, to rotate the elongate rod 71 in the opposed first "F" and second "S" rotational directions. The electrically energizable motor 80 is mounted at the top end 51 of the main body portion 50 at either the left side or the right side thereof, so as to not be in the way of the frame 24 of the hand truck 22, or in the way of an operator of the elevating unit 20. A guard member 88 is mounted over the drive chain 81, as can be seen in Figures 1A, 1B, 5, 6A–6E, 7A, and 7B.

A control means 81 is operatively coupled to the drive means 70 to permit selective actuation of the drive means 70 in its first rotational direction, as indicated by arrow "F", and its second rotational direction as indicated by arrow "S". In the preferred embodiment shown, the control means 81 comprises a three-position electrical switch 82 connected in selective electrically conductive relation between an electrical power source, such as an electrical power storage cell 84, by a first electrical cable 87, and the electrically energizable motor 80 by a second electrical cable 83 (see FIGS. 3 and 4). When the three-positional electrical switch 82 is in its first position, the motor 80 is energized so as to cause the threaded rod 70 to rotate in its first rotational direction "F". When the three-position electrical switch 82 is in its second position, the reversible motor 80 is energized so as to cause the threaded rod 71 to rotate in its second opposite rotational direction "F". When the three-position electrical switch is in its third position, which third position is preferably a central position, the reversible motor 80 is not energized, thus precluding the threaded rod 71 from rotating.

In the preferred embodiment shown, the electrical power storage cell 84 is mounted in an enclosure 85 in order to cover the storage cell 84 for safety reasons and also to preclude damage to the electrical power storage cell 84. Preferably, the enclosure 85, and therefore the electrical power storage cell 84, are located adjacent the bottom end 53 of the main body portion 50 so as to help provide for a low centre of gravity of the elevating unit 20, as the electrical power storage cell 84 is typically somewhat heavy. The electrical power storage cell 84 is rechargeable in situ by means of a conventional electrical cord (not shown) plugged into a receiving socket 86 mounted in a side wall of enclosure 85. The electrical power storage cell 84 can thereby be readily recharged when it is not in use, such as when it is in a delivery truck 21 (see FIGS. 7A and 7B). The elevating unit 20 would be not in use while the delivery truck 21 is on route between delivery destinations, or in the event the elevating unit 20 is not needed to help negotiate the hand truck 22 onto or off of the delivery truck 21 or up or down a set of stairs.

A first bracket means 90 is mounted on the main body portion 50 of the elevating device 20 for removable secure engagement of the main body portion 50 to the upper cross-member 34 of the manual hand truck 22 by means of a brace bracket 95 and threaded fasteners 97. In the preferred embodiment, the first bracket means 90 is disposed at the front side 52 of the main body portion 50 of the elevating unit 20. The first bracket means 90 comprises a load bearing portion 92 shaped and dimensioned to receive the upper cross-member 34 in load bearing relation thereon, and a weight transmitting portion 94 shaped and dimensioned to rest on the upper cross-member 34 in weight transmitting relation. The first bracket means 90 is substantially "C"-shaped in cross-section, defining a forwardly facing opening 96. The lower arm 97 of the "C"-shaped bracket means 90 forms a portion of the load bearing portion 92. thus, the upper arm 98 of the "C"-shaped bracket means 90 forms a portion of the weight transmitting portion 94. The load bearing portion 92 and the weight transmitting portion 94 are spaced apart sufficiently by a distance "E" so as to receive the upper cross-member 34 therebetween, as can best be seen in FIGS. 3 and 4.

It can be seen that when the extension leg 60 is in its first extended position, the foot 62 is positioned to engage an upwardly facing surface such as the ground, the floor, or the like. In this manner, the elevating unit 20 must support the entire load of the hand truck 22 and a payload 25 thereon disposed on the payload supporting surface 44. The load of the hand truck 22 and the payload 25 thereon is borne directly by the load bearing portion 92 of the first bracket means 90.

Further, it can be seen that when the extension legs 60 is in its second retracted position, the foot 62 is not in position to be in contact with the ground, a floor, or the like. The wheels 46 of the hand truck 22 are then in contact with the ground, or the floor, or the like, and support the hand truck 22 and a payload 25 thereon. In this configuration, the hand truck 22 also supports the weight of the elevating unit 20 through the weight transmitting portion 94 of the first bracket means 90.

A channel blocking means, in the form of two cooperating pins 91, is moveable between a first blocking position and a second open position. In the first blocking position, the pins 91 each engage aligned apertures 93 in the load bearing portion 92 and the weight transmitting portion 94 of the first bracket means 90. The pins 91 are held in place by gravity, so as to occlude the opening 96, thereby holding the upper cross-member 34 in operative, secured relation within the opening 96. In the second open position, the pins 91 are removed from the apertures 93, and thereby removed from occluding the opening 96, to thereby provide ingress and egress of the upper cross-member 34. Conventional spring-loaded pins having discrete open and closed positioned may be routinely substituted for the simple pins 91 shown.

A second bracket means 100 is mounted to the main body portion 50 adjacent its lower end for removable secure engagement of the main body portion to the lower cross-member 36. The second bracket means 100 comprises a weight transmitting portion 102 shaped and dimensioned to rest on the lower cross-member 36 in weight transmitting relation. The second bracket means 100 further comprises a flange portion 104 (see FIGS. 3 and 4) depending from the weight transmitting portion 102 and a guide portion 103 also depending from the weight transmitting portion 102, such that the flange portion 104, the weight transmitting portion 102, and the guide portion 103 together form a downwardly open generally "U"-shaped channel dimensioned to receive the lower cross-member 36 therein.

In the preferred embodiment, the lower cross-member 36 comprises an axle member defining a common lateral axis "L", with a pair of spacer members 106 disposed in surrounding relation around the axle member 36. The spacer members 106 are spaced apart one from the other on the axle member 36 by a centrally disposed gap 108 (see FIG. 1A). The second bracket means 100 engages the axle member 36 at the gap 108.

In order to attach the elevating unit 20 to the manual hand truck 22, the foot portion 62 of the extension leg 60 is positioned between the axle 36 and the frame 24 of the hand truck 22, as indicated by arrow "I" in FIG. 1A. The second bracket means 100 rests on the axle 36 of the hand truck 22 in the gap 108. The elevating unit 20 is then pushed forwardly at its top so as to pivot about the axle 36, such that the first bracket means 90 moves forwardly towards the upper cross-member 34, until the upper cross-member 34 enters the opening in the substantially "C"-shaped first bracket 90. Pins 91 are then put into place in apertures 93, so as to occlude the opening 96, thereby holding the upper cross-member 34 in operative secured relation.

Attachment of the elevating unit 20 to the manual hand truck 22 is quick and easy, thus allowing an operator of the manual hand truck 22 to include and use the elevating unit 20, as desired, or to not include and not use the elevating unit 20, as desired, without a significant amount of time investment required for attachment and subsequent removal of the elevating unit 20. Such selective use of the elevating unit 20 to assist the manipulation of the manual hand truck 22 is extremely advantageous, as it is usable on an "as needed basis", but is not required to be present on the manual hand truck 22 when not needed, allowing the operator to selectively manipulate only the hand truck 22 and payload 25 thereon.

Figure 6E:
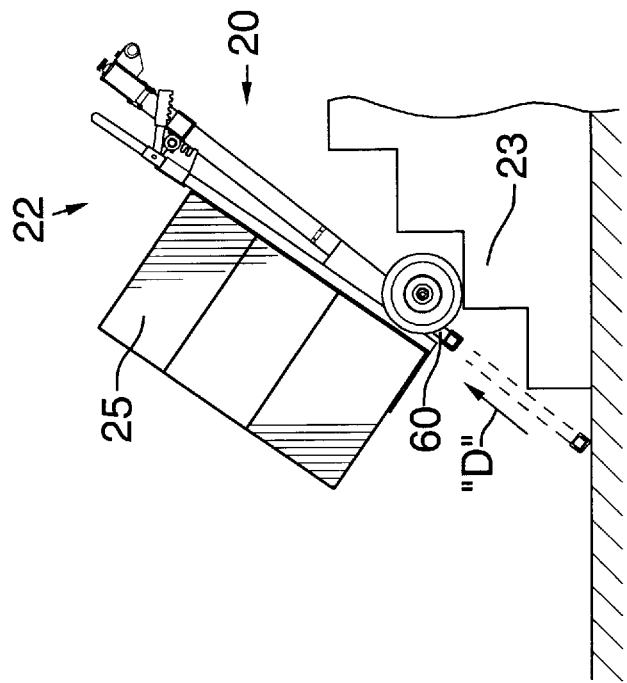
Figure 6D:
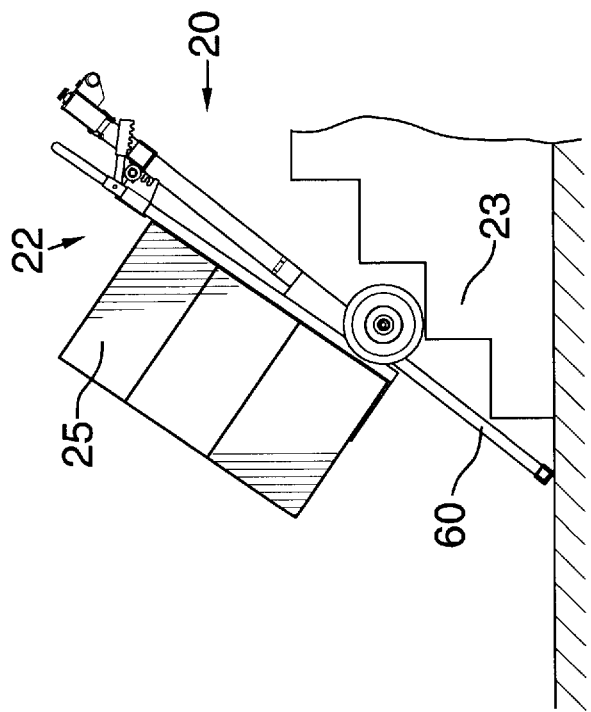

In use, the elevating unit 20 can be used to help manipulate a manual hand truck 22 and a payload 25 thereon up a flight of stairs, as can be best seen in FIGS. 6A through 6E. To lift the hand truck 22 and payload 25 thereon up the stairs 23, the elevating unit 20 is attached to the hand truck 22, in the manner described immediately above, and the elevating unit 20 and the hand truck 22 are wheeled to the bottom of the stairs 23, as is best seen in FIG. 6A. The elevating unit 20 and the hand truck 22 are tilted rearwardly, as indicated by arrow "G" in FIG. 6B. The electrical switch 82 is then manipulated to its first position so as to cause the reversible motor 82 to rotate the elongate threaded rod 71 in a first direction "F", thus causing the circulating ball nut 72 and the extension leg 60 to travel along the elongate threaded rod 71 in a first direction as indicated by arrow "C" of FIG. 6C, toward the first extended position of the extension leg 60. Correspondingly, the remainder of the elevating unit 20, the hand truck 22, and the payload 25 thereon are lifted upwardly, as indicated by arrow "H" in FIG. 6C. When the wheels 46 of the hand truck 22 are slightly above a selected step of the stairs 23, the electrical switch 82 is manipulated to its third (neutral) position so as to stop the reversible motor 80. The elevating unit 20 and the hand truck 22 and payload 25 thereon are then leaned toward the stairs 23 until the wheels 46 are resting on said selected one of the steps of the stairs 23, as shown in FIG. 6D. The electrical switch 82 is then manipulated to its second position so as to cause the reversible motor 80 to rotate the elongate threaded rod in its second rotational direction "S", thus causing the extension leg 60 to move in a second direction as indicated by arrow "D" in FIG. 6E, towards its second retracted position. The same cycle of steps is then repeated to move the hand truck 22 and payload 25 up subsequent ones of the steps 23. The elevating unit 20 may be used to also manipulate a manual hand truck 22 and a payload 25 thereon down a set of stairs, by using a generally reversed procedure to that described above.

Similarly, as can be seen in FIGS. 7A and 7B, the elevating unit 20 may be used to assist in lifting the hand truck 22 and payload 25 thereon onto the delivery truck 21, as shown by arrow "J" in FIG. 7B, in a manner similar to that described for manipulating the hand truck 22 and payload 25 thereon up a flight of stairs. The elevating unit 20 may be used to also manipulate a manual hand truck 22 and a payload thereon down off of the delivery truck 21.

A very important advantage of the elevating unit 20 of the present invention over the prior art is that of cost efficiency. It is not necessary to replace presently owned manual hand trucks, many of which manual hand trucks are quite expensive, with even more expensive powered hand trucks. Instead, it is necessary to purchase a desired quantity of the relatively inexpensive elevating unit of the present invention only as complementary units to presently owned manual hand trucks.

Other modifications and alterations may be used in the design and manufacture of the apparatus of the present invention without departing from the spirit and scope of the accompanying claims. For instance, it is contemplated that a manual version of the elevating unit 20 of the present invention could employ a manual crank (not shown) in place of the electrically energizable motor 80. These and other routine modifications will be readily apparent to those skilled in the art, such that the invention is only limited by the scope of the appended claims.

I claim:

1. In combination:
    a hand truck having a frame extending in a substantially vertical direction from a lower end to an upper end and extending laterally from a left side to a right side, upper and lower cross-members extending substantially between said left and right sides of said frame, a handle means disposed adjacent said upper end, a front side and a back side, with a payload supporting surface extending forwardly from said front side, and a pair of wheels operatively mounted on said frame adjacent the lower end thereof for rotation about a common lateral axis, and,
    an elevating unit for readily removable attachment on said hand truck said elevating unit comprising:
        a main body portion having a front side and a back side;
        an extension leg having a foot portion and being operatively mounted on said main body portion for selectively controlled movement between a first extended position whereat said foot portion is disposed below said lower end of said frame and a second retracted position whereat said foot portion is raised from being disposed below said lower end of said frame;
        drive means operatively coupled to said extension leg to selectively move said extension leg in a first direction from said first extended position to said second retracted position and in a second direction from said second retracted position to said first extended position;
        control means operatively coupled to said drive means to permit selective actuation of said drive means in said first and second directions;
        a first bracket means mounted on said main body portion in disposed relation to said front side of said main body portion for readily removable secured engagement of the main body portion to said upper cross-member of said hand truck, said first bracket means being substantially C-shaped in cross section, defining a forwardly facing opening, with a lower arm of the C-shape forming a load bearing portion and with an upper arm of the C-shape forming a weight transmitting portion, said upper and lower arm portions being spaced apart sufficiently to receive said upper cross-member there between;
        a channel blocking means readily movable between a first blocking position whereat said channel blocking means occludes said opening to thereby hold said upper cross-member in operative, secured relation, and a second open position whereat said channel blocking means is removed from occluding said opening to thereby provide for ingress and egress of said upper cross-member;
        a second bracket means rigidly mounted in fixed relation on said main body portion and in disposed non-movable relation to said back side of said main body portion for readily removable secured engagement of the main body portion to said lower cross-member, said second bracket means comprising a weight transmitting portion shaped and dimensioned to rest on said lower cross-member in weight transmitting relation; and,
        a pair of cylindrical spacer members disposed in substantially complete surrounding relation around said axle member inboard of said left and right sides of said frame, with said spacer members being spaced apart one from the other on said axle member by a centrally disposed gap, and wherein said second bracket means engages said axle member at said gap.

2. The combination of claim 1, further comprising a flange portion and a guide portion each depending from said weight transmitting portion of said second bracket means in spaced relation, such that said flange portion, said weight transmitting portion, and said guide portion together form a downwardly open generally "U"-shaped channel dimensioned to receive said lower cross-member therein.

3. The elevating unit of claim 2, wherein said lower cross-member comprises an axle member defining said common lateral axis.

4. The combination of claim 3, wherein said extension leg is elongate along a first longitudinal axis.

5. The combination of claim 4, wherein said extension leg is substantially vertically disposed when in said first extended position.

6. The combination of claim 5, wherein said extension leg is substantially vertically disposed when in said second retracted position.

7. The combination of claim 6, wherein said extension leg moves linearly along its first longitudinal axis when moving between its first extended position and its second retracted position.

8. In combination: a hand truck having a frame extending in a substantially vertical direction from a lower end to an upper end and extending laterally from a left side to a right side, an upper cross-member extending substantially between said left and right sides of said frame, a lower cross-member formed by an axle member extending substantially between said left and right sides of said frame adjacent said lower end, a handle means disposed adjacent said upper end, a front side and a back side, with a payload supporting surface extending forwardly from said front side, and a pair of wheels operatively mounted on said axle member for rotation about a common lateral axis defined by said axle member, and, an elevating unit for readily removable attachment on said hand truck, said elevating unit comprising:

a main body portion having a front side and a back side;

an extension leg elongate along a substantially vertical first longitudinal axis and having a foot portion, said extension leg being operatively mounted on said main body portion for selectively controlled movement along said first longitudinal axis between a first extended position whereat said foot portion is disposed below said lower end of said frame and a second retracted position whereat said foot portion is raised from being disposed below said lower end of said frame;

drive means operatively coupled to said extension leg to selectively move said extension leg in a first direction from said first extended position to said second retracted position and in a second direction from said second retracted position to said first extended position, said drive means comprising a substantially vertically disposed elongate threaded rod having a second longitudinal axis substantially aligned with said first longitudinal axis, and being operatively mounted on said main body portion for rotation in opposed first and second rotational directions about said second longitudinal axis, a recirculating ball nut threadibly engaged on said elongate threaded rod for movement along the length thereof as said elongate threaded rod rotates, and wherein said extension leg is secured to said recirculating ball nut for movement therewith as aforesaid, whereby rotation of said threaded rod in said first rotational direction causes linear movement of said extension leg toward said first extended position and rotation of said threaded rod in said second rotational direction causes linear movement of said extension leg toward said second retracted position;

control means operatively coupled to said drive means to permit selective actuation of said drive means in said first and second directions;

a first bracket means mounted to said main body portion in disposed relation to said front side of said main body portion for readily removable secured engagement of the main body portion to said upper cross-member of said hand truck, said first bracket means being substantially C-shaped in cross section, defining a forwardly facing opening, with a lower arm of the C-shape forming a load bearing portion and with an upper arm of the C-shape forming a weight transmitting portion, said upper and lower arm portions being spaced apart sufficiently to receive said upper cross-member there between;

a channel blocking means readily movable between a first blocking position whereat said channel blocking means occludes said opening to thereby hold said upper cross-member in operative, secured relation, and a second open position whereat said channel blocking means is removed from occluding said opening to thereby provide for ingress and egress of said upper cross-member;

a second bracket means rigidly mounted in fixed relation on said main body portion in disposed relation to said back side of said main body portion for readily removable secured engagement of the main body portion to said lower cross-member said second bracket means comprising a weight transmitting portion shaped and dimensioned to rest on said lower cross-member in weight transmitting relation;

a flange portion and a guide portion each depending from said weight transmitting portion of said second bracket means in spaced relation, such that said flange portion, said weight transmitting portion, and said guide portion together form a downwardly open generally "U"-shaped channel dimensioned to receive said lower cross-member therein; and, a pair of cylindrical spacer members disposed in substantially complete surrounding relation around said axle member inboard of said left and right sides of said frame. with said spacer members being spaced apart one from the other on said axle member by a centrally disposed gap, and wherein said second bracket means engages said axle member at said gap.

9. The elevating unit of claim 8, wherein said extension leg is disposed in sliding relation within said main body portion and in surrounding relation to said threaded rod.

10. The combination of claim 9, further comprising slide bearing means disposed in operative relation between said extension leg and said main body portion.

11. The combination of claim 10, wherein said slide bearing means comprises a first bearing assembly mounted on said extension leg adjacent the top end thereof, and a second bearing assembly mounted on said main body portion adjacent the top end thereof.

12. The elevating unit of claim 11, wherein said drive means comprises motor means operatively connected to said elongate threaded rod to rotate said elongate threaded rod in said opposed first and second rotational directions.

13. The elevating unit of claim 12, wherein said motor means comprises an electrically energizable reversible motor.

14. The combination of claim 13, wherein said control means comprises a three position electrical switch connected in electrically conductive relation between an electrical power source and said electrically energizable motor, with a first position of said three position electrical switch causing said threaded rod to rotate in said first rotational direction, *with a second position of said three position electrical switch causing said threaded rod to rotate in said second rotational* *direction, and with a third position of said three position electrical switch precluding said threaded rod from rotating.*

15. The elevating unit of claim 14, wherein said electrical power source comprises an electrical power storage cell mounted on said main body portion.

16. The combination of claim 15, wherein said electrical power storage cell is rechargeable in situ.

* * * * *